(12) United States Patent
Huang

(10) Patent No.: US 9,412,986 B2
(45) Date of Patent: Aug. 9, 2016

(54) POROUS COMPOSITE STRUCTURES FOR LITHIUM-ION BATTERY SEPARATORS

(71) Applicant: GM GLOBAL TECHNOLOGY OPERATIONS LLC, Detroit, MI (US)

(72) Inventor: Xiaosong Huang, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 255 days.

(21) Appl. No.: 13/955,025

(22) Filed: Jul. 31, 2013

(65) Prior Publication Data

US 2015/0037651 A1    Feb. 5, 2015

(51) Int. Cl.
*H01M 2/16* (2006.01)
*H01M 2/14* (2006.01)
*H01M 10/0525* (2010.01)

(52) U.S. Cl.
CPC ............ *H01M 2/1626* (2013.01); *H01M 2/145* (2013.01); *H01M 2/1653* (2013.01); *H01M 2/1666* (2013.01); *H01M 10/0525* (2013.01); *Y02T 10/7011* (2013.01)

(58) Field of Classification Search
CPC ..... H01M 2/16; H01M 2/1626; H01M 2/145; H01M 2/1653; H01M 2/1666; H01M 10/0525
See application file for complete search history.

(56) References Cited

U.S. PATENT DOCUMENTS

| | | | |
|---|---|---|---|
| 3,551,275 A * | 12/1970 | Teng | D01D 5/00 106/282 |
| 8,455,140 B1 | 6/2013 | Huang et al. | |
| 8,460,829 B1 | 6/2013 | Huang et al. | |
| 8,470,468 B2 | 6/2013 | Xiao et al. | |
| 8,470,898 B2 | 6/2013 | Huang | |
| 2004/0264108 A1 * | 12/2004 | Yamazaki | H01G 9/02 361/502 |
| 2005/0208383 A1 * | 9/2005 | Totsuka | H01M 2/162 429/247 |
| 2009/0067119 A1 * | 3/2009 | Katayama | H01G 9/02 361/523 |
| 2009/0087728 A1 * | 4/2009 | Less | H01M 2/162 429/129 |
| 2012/0070729 A1 * | 3/2012 | Wertz | C03C 3/064 429/188 |
| 2012/0115063 A1 * | 5/2012 | Sumioka | H01M 8/1002 429/480 |
| 2012/0156568 A1 * | 6/2012 | Kia | H01M 10/0525 429/246 |
| 2012/0156569 A1 | 6/2012 | Kia et al. | |
| 2012/0231321 A1 | 9/2012 | Huang et al. | |
| 2012/0295165 A1 * | 11/2012 | Morin | D21H 13/10 429/247 |
| 2012/0308872 A1 | 12/2012 | Huang | |
| 2012/0308892 A1 * | 12/2012 | Chami | H01M 2/1606 429/221 |
| 2013/0131200 A1 | 5/2013 | Huang | |
| 2013/0224602 A1 | 8/2013 | Huang | |

* cited by examiner

*Primary Examiner* — Sarah A Slifka
*Assistant Examiner* — Brian Ohara
(74) *Attorney, Agent, or Firm* — Reising Ethington P.C.

(57) ABSTRACT

Micro-fibrillated cellulose nanofibers (or other suitable fibrillated organic polymer nanofibers) are dispersed with ceramic particles (such as alumina or silica powder) in water suspension and formed into a suitable porous mat shape by wet-laying the suspension on a suitable mesh structure. After removal of the mat from the mesh and drying, the suitably proportioned cellulose nanofibers/ceramic powder composite may be coated with a thin porous polymer layer to further fix the particles between the fibers and strengthen the resulting composite membrane for use as a separator layer between the electrode layers of an electrochemical cell. The strength and temperature resistance of the composite separator layer make it particularly useful in lithium-ion batteries for vehicle traction motors.

12 Claims, 4 Drawing Sheets

POROUS COMPOSITE STRUCTURES FOR LITHIUM-ION BATTERY SEPARATORS

TECHNICAL FIELD

This disclosure pertains to porous, composite, separator membranes for physically separating closely-spaced anode and cathode layers in electrochemical cells for secondary batteries. More specifically, this disclosure pertains to the use of micro-fibrillated organic polymer nanofibers with ceramic or high temperature resistant polymer particles and a porous polymeric binder coating in making such thin, porous separator membranes. In this disclosure, the composite separators are demonstrated to be durable and to withstand elevated temperatures.

BACKGROUND OF THE INVENTION

A secondary liquid-electrolyte battery generally contains at least one electrochemical cell that includes a negative electrode, a positive electrode, and a separator situated between the electrodes. The negative and positive electrodes are constructed from materials that can participate in both oxidation and reduction reactions. Such electrode materials allow an electric current to be reversibly passed between the electrodes in an external circuit, while an ionic species migrates within the cell, between the electrodes through the separator within a liquid electrolyte to electrochemically balance the external electron current flow. These concurrent electrical current and ionic current flows occur spontaneously during cell discharge. During cell discharge, oxidation occurs spontaneously at the negative electrode and reduction occurs at the positive electrode. Reverse reactions are compelled during the cell charge phase in which oxidation occurs at the positive electrode and reduction occurs at the negative electrode. The electric current generated during cell discharge may be used to power, at least in part, an electrical load, while an applied voltage from an external power source may be used to charge, or re-power, the cell once its current capacity has fallen to an undesirable level.

Lithium-ion electrochemical cells, for example, are used in many secondary, liquid-electrolyte batteries. In one example of a lithium-ion cell, the electrolyte comprises a suitable lithium compound, such as $LiPF_6$, which is dissolved in a non-aqueous organic liquid. The anode may comprise a thin layer of graphite suitably bonded to a thin metal current collector strip. Lithium is intercalated into the graphite layers during charging of the cell. And the cathode comprises a thin layer of a suitable lithium compound, also bonded to a thin metal current collector strip, for receiving lithium ions transported from the anode through the electrolyte to the cathode during discharge of the cell. A thin porous polymer separator membrane is placed between the anode and cathode layers.

The separator facilitates operation of the electrochemical battery cell by providing a porous and electrically-insulative mechanical support barrier between the two electrodes. The separator, in general, has a porosity sufficient to contain the liquid electrolyte—which can transport the ionic species between the electrodes—yet is thermally, chemically, and mechanically stable enough to separate the closely spaced, opposing negative and positive electrodes over the course of many discharge/charge cell cycles so that a short-circuit is prevented. A wide variety of materials, either alone or in combination with one another, have been either utilized or investigated for construction of the separator with the goal of imparting long term operational reliability to the separator within different working environments. The most commonly used separators today are made from a single flat polyolefin sheet membrane or a laminate of several flat polyolefin sheet membranes. The particular polyolefins usually employed are those derived from simple low-carbon-number olefins, such as polypropylene and polyethylene.

The electrochemical battery cell, in order to interact with the electrical load and the external power source, is configured for connection to an external circuit that provides an electric current path between the negative and positive electrodes external to the electrochemical cell. Each of the negative and positive electrodes, for instance, is typically associated with a metallic current collector that helps distribute the electric current passing through the external circuit to and from all electrochemically active regions of the electrodes. A connection feature such as a connector tab may be included on each of the metallic current collectors. The connection feature may protrude away from the electrochemical battery cell to operatively establish an electrical connection with the external circuit. This is usually accomplished by connecting the protruding connection features associated with the negative and positive electrodes to negative and positive terminals, respectively, in either a serial or parallel relationship with the connection features associated with other electrochemical battery cells. Negative and positive terminals may not be needed, however, if the secondary liquid-electrolyte battery includes only one electrochemical battery cell.

In automotive vehicle applications, for example, many lithium-ion electrochemical cells may be interconnected in series and parallel electrical circuit connections to form a secondary battery that is capable of delivering substantial electrical power at a relatively high voltage to a traction motor for driving the vehicle. The battery is subject to ambient heating and cooling in the vehicle environment. In this application, the thin electrode and separator elements of each cell also experience heating due to significant power load demand and are subjected to many repeated discharge and re-charge cycles. But, more critically, the battery may experience significant heating under abusive conditions. Thin polyolefin separators, for example, may be exposed to elevated temperatures which soften them and reduce their effectiveness in maintaining suitable separation of closely spaced anode and cathode layers. The shrinkage experienced by a polyolefin separator at an elevated temperature can also increase the risk of battery electrical shorting. There is a need to consider other materials which can be formed into strong, temperature resistant, and electrochemically effective separator membranes or thin layers.

SUMMARY OF THE INVENTION

A porous, fibrous, composite separator layer and a method of making the separator layer are disclosed. The separator layer may function as all or part of a separator for an electrochemical battery cell (sometimes referred to as "a cell" or "the cell" for brevity) of a secondary, liquid-electrolyte battery, such as a lithium-ion battery.

In a preferred embodiment the separator layer comprises a suitably-proportioned mixture of Celish micro-fibrillated cellulose nanofibers and ceramic powder which is formed by a wet-laying process into a thin composite mat or membrane having a typical initial thickness of about 15 to about 50 micro-meters (µm). The cellulose nanofibers are not woven; they are deposited in a thin flat layer from a well dispersed aqueous suspension onto a wire mesh to pass the water and form a flattened, but random directional arrangement of the thin stem, highly branched, cellulose fibers. Micron-size silica or alumina particles are suitable ceramic material.

Other suitable organic polymer fibers include polyethylene terephthalate (PET) fibers, poly(acrylonitrile) (PAN) fibers, and polyamide fibers. In the case of polyamide fibers, it is preferred that they have a softening temperature above about 100° C. Examples of suitable aliphatic polyamides (PA) include PA6, PA66, PA6, 12. Kevlar® is a suitable aromatic polyamide (poly-paraphenylene terephthalamide). It is preferred that these polymer fibers also be used in a highly-branched (or micro-fibrillated) condition. One method of producing fibrillated fibers from un-branched or plain fibers is to place the plain fibers under high fluid pressure and to quickly release the pressure.

The ceramic particles are dispersed among the cellulose nanofibers during the wet-layup process so as to provide for some increased separation between overlying or contacting cellulose nanofibers. The proportions of ceramic powder and cellulose fibers may be adjusted to provide for pore shapes and volumes that enable suitable electrolyte filling of the separator layer and enable suitable ion transport through the separator layer from one electrode-engaging surface to its opposing electrode-engaging surface. It is often preferred that ceramic powder be used in an amount by weight that is in the range of about 25% to about 300% of the weight of the fibers in the mixture.

When the thin, flat composite mat has been formed and dried, a thin porous coating of a suitable polymer, such as polyvinylidene fluoride (PVDF), is applied to the composite of cellulose fibers and ceramic particles to augment the mechanical strength of the separator mat, to keep the ceramic particles from separating from adjacent cellulose fibers, and to improve the uniformity of the porous composite structure formed of the small, highly-branched cellulose fibers and the small ceramic particles. Examples of other suitable polymeric coating materials include are poly(acrylonitrile) (PAN), poly(methyl methacrylate) (PMMA), and copolymers that contain PVDF moiety segments, PAN segments, or PMMA segments. Preferably, the coating is applied in an amount that adds up to about two microns to the overall thickness of the composite mat or membrane. The composite separator membrane may be shaped or cut to form a shape that will complement the shapes and areas of cell electrode material layers that are to be assembled into face-to face contact with the separator material and electrically isolated or separated by it.

Celish-type micro-fibrillated cellulose fibers are commercially available (e.g., Daicel Finechem Ltd). They are made from highly refined, pure plant fibers (such as cotton fibers, soft wood fibers, bamboo fibers, or the like) through a strong mechanical shearing force provided by a super-high-pressure homogenizer. The name "Celish" (which may be a registered name in some locations) applies to the natural-fiber treating process which results in the formation of smaller-diameter cellulose fibers with a highly branched structure in which the diameters of the main fiber stems are in the range of about 0.01 μm to about 0.1 μm (10 to 100 nanometers). The overall diameters of the fibrillated branched fibers are up to about 2 microns. The average lengths of the micro-fibrillated cellulose fibers may be in the range of about five micro-meters to a thousand micrometers. The Celish micro-fibrillated fibers typically have a specific surface area of about 50 $m^2$/g to about 300 $m^2$/g. The Celish micro-fibrillated cellulose fibers are mechanically strong and heat resistant and provide very useful properties for use as a portion of a separator membrane in a lithium-ion electrochemical cell. Other suitable fibrous materials such as PET fibers, PAN fibers, and polyamide fibers are also commercially available.

Ground and fumed alumina ($Al_2O_3$) particles or silica ($SiO_2$) particles having average diameters of less than five micro-meters are suitable for use as the ceramic particles in the composite fibrous separator mat material. The preferred particle size is 100 nm to about two microns. Other suitable particle materials include calcium carbonate, titania, and high temperature resistant polymer particles (i.e., epoxy, polyimide, PAN, polyamide) in the same size range.

In an illustrative example, roughly equal portions by weight of the cellulose fibers and the ceramic particles (gamma-alumina or Cab-O-Sil silica) are thoroughly dispersed in distilled water to form a suspension of the small solid particles. The aqueous suspension is then filtered in a batch process onto one or more layers of 100 mesh metal screens to obtain wet composite mats with initial thicknesses greater than about 35 μm. The cellulose fiber-ceramic particle composite mats are oven-dried on the mesh screens. The dried mats are removed from the supporting screens and further compacted as may be necessary to assure the desired, predetermined density and porosity. A preferred final thickness is up to fifty microns. The ceramic particles are used in proportional combination with the cellulose fibers to improve the uniformity of the non-woven mat, to increase the resistance of the non-woven mate to penetration by material particles growing on an electrode material layer surface, and to alter or control the porosity in the mat by separating adjacent nanofibers. It will generally be desirable to form the initial mat with a suitable planar shape and area for cutting or forming one or more separator membranes from the mat. Such separator structures are usually sized and shaped to fully and suitably separate an anode layer from an adjacent cathode layer, even when the facing areas of the facing electrodes may be different.

The porous polymer coating, for example of PVDF, is suitably applied by dissolving the polymer in a liquid mixture of a solvent (such as acetone) and non-solvent (such as water), applying the solution to the composite fiber-particle mat material, and depositing the polymer coating from the solution as a porous layer on the nanofibers and ceramic particles using a solvent phase-inversion process, described in more detail below in this specification. The porosity of the composite mat material, whether coated with a porous polymer or uncoated, is suitably in the range of about 20% to about 90% of the superficial or external outline volume of the composite structure. The preferred porosity is in the range of about 30% to about 70% of the outline volume.

As will also be shown in detail below in this specification, the resulting porous resin-coated, cellulose nanofiber-ceramic particle composite separator layer is found to provide acceptable strength, excellent dimensional stability at elevated cell operating temperatures, and good electrochemical performance in lithium-ion electrochemical cells.

DESCRIPTION OF PREFERRED EMBODIMENTS

As summarized above in this specification, the separator mats of this disclosure are formed using a combination of micro-fibrillated, organic polymer nanofibers (polymer nanofibers with carbon-containing molecular backbones) and ceramic particles (or temperature resistant polymer particles). The nanofibers are preferably micro-fibrillated cellulose nanofibers having main fiber stem diameters in the nanometer-size range. Such micro-fibrillated cellulose nanofibers are commercially available. While any of many different suitable ceramic particle compositions may be used in the composite separator mats (or membranes), fumed and ground alumina and silica particles are preferred. They are effective, readily available, and relatively inexpensive.

In the following illustrative description, composite separators are made and incorporated into illustrative lithium-ion cells. These descriptions are of specific examples and are not intended to limit the scope of this invention.

Figure 1:
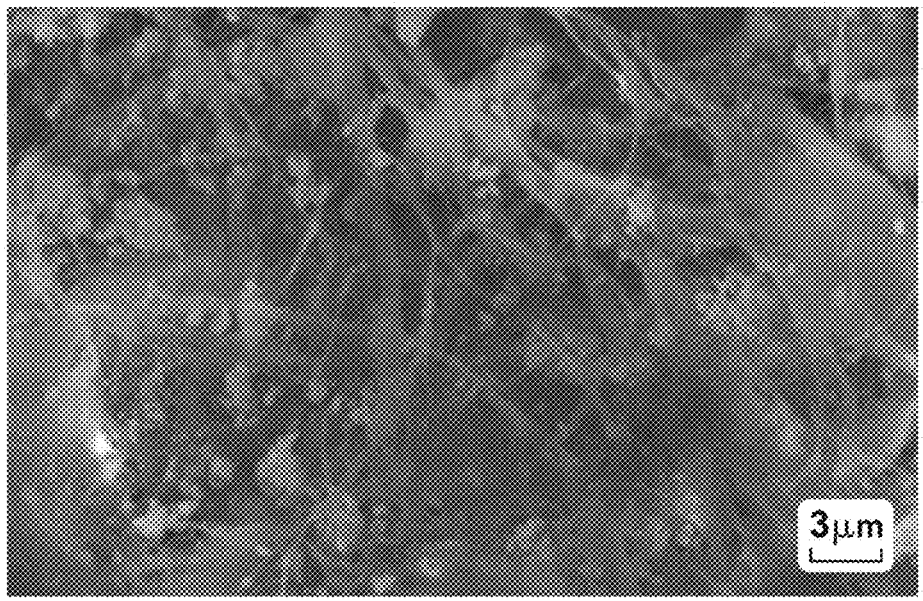
FIG. 1 is a scanning electron microscope image (SEM) of a composite mat of microfibrillated cellulose fibers and Cab-O-Sil ground silica particles after their mixture in water was wet-laid on a metal screen, dried on the screen, and removed from the screen.

The fiber used in this illustration was Celish micro-fibrillated cellulose (sometimes identified as MFC in this specification) (Daicel Finechem Ltd). MFC is micro-fibrillated cellulose nanofibers made from refined pure plant fibers through a strong mechanical shearing force provided by a super-high-pressure homogenizer. It has a highly branched structure and the fiber stem diameter can be from 0.1 to 0.01 μm (i.e., about 100 to about ten nanometers). The overall diameter or reach of the cellulose fiber branches may be up to about two microns as seen in FIG. 1. The ceramic powder was Cab-O-Sil silica of one-micron nominal particle size. Alumina particles of substantially the same average particle size are also preferred.

The preparation of the micro-fibrillated cellulose fiber (MFC) composite mats was achieved by a wet-laid (paper-making) process. In this example, controlled amounts of cellulose fibrils and silica were weighed and mixed in distilled water using a bench-scale shear blender for about 10 seconds. The uniform aqueous dispersions of the fibers and particles were filtered in a batch process onto two layers of 100 mesh metal screens and then dried in an oven at 80° C. for two hours. Upon careful removal from the 100 mesh screens, composite mats with initial thicknesses of >35 μm were obtained. In this example, the aqueous suspension was poured onto the mesh surface in a circular pattern to form round mats that were about four inches in diameter. However, the mats may be formed in larger sheets of virtually any shape and area or in a continuous process (paper making process). After the initial shape is formed, individual separator shapes of suitable size and area for a separator application may be cut from the initial mat.

A further step of compressing the wet-laid composite mats improved the mat uniformity and increased their mechanical properties. The mats were compressed under a pressure of 3 MPa for 20 seconds at room temperature between two parallel plates on a 50 Ton PHI hand press (SRPRSS-8004). The composite separators were then dried at 120° C. overnight before the characterization of their properties. The thickness of the compressed and dried separator mats was now in the twenty to thirty micrometer range.

In addition, some of the pressed mats were coated with porous polyvinylidene fluoride (PVDF) (Kynar® 761) by dipping in a coating bath consisting of a solution of 0.6 g of PVDF dissolved in a mixture of 0.4 g of distilled water and 14 g of acetone. Technical grade acetone for application of PVDF coatings was purchased from Sigma-Aldrich (St. Louis, Mo.). A porous PVDF structure was formed with the evaporation of acetone, via the well-known phase inversion process. As the acetone was progressively vaporized and removed from the acetone-water solution, globules of PVDF separated from the residual solution with entrained water. When the acetone was essentially removed, the coated mats were slowly heated to remove entrained water from the polymer coating and to leave a dried and porous PVDF, following water removal. The PVDF coating was added to augment the separator mechanical strength, keep ceramic particles from falling off, and improve the separator surface uniformity. The coated composite mats were then dried at 120° C. overnight for characterizations. Polymer coating of the cellulose fiber-silica powder mats may result in a small increase in their thickness and a small decrease in their porosity. The polymer coating is distributed throughout the porous composite mat structure. It is applied such that the overall thickness of the mat is increased by an amount of about two microns.

Figure 2:
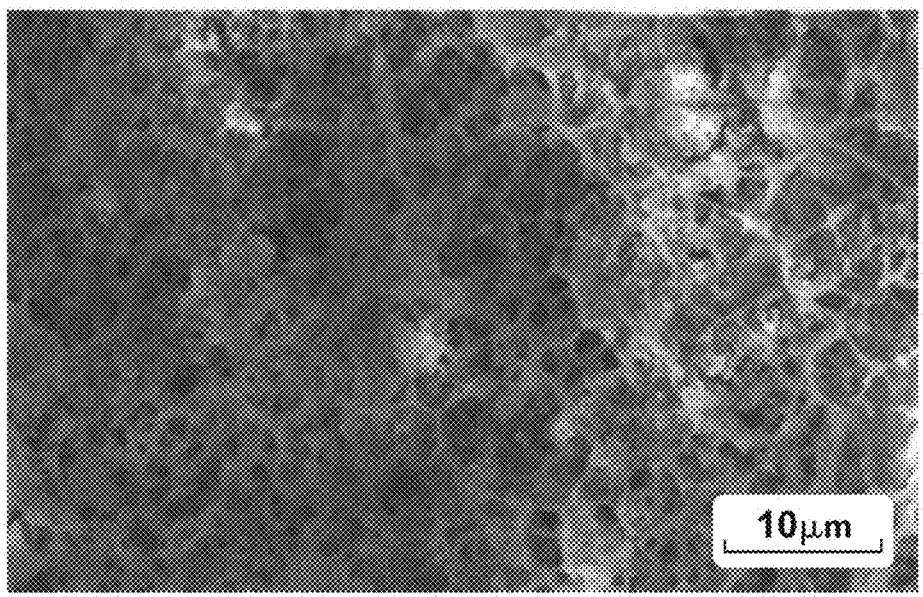
FIG. 2 is an SEM image of the composite mat of FIG. 1 after the cellulose nanofibers and interspersed silica particles of the thin dried mat were coated with a thin porous layer of polyvinylidene difluoride.

FIG. 1 is a SEM image of a small portion of the wet-laid and dried mat of cellulose fibers with dispersed silica particles. The one-micron size silica particles are dispersed on and among the multi-branched cellulose nanofibers. FIG. 2 is a SEM image of the mat of FIG. 1 after the formation of the porous PVDF coating. As can be seen in FIG. 2, a porous PVDF layer covers the surfaces of the cellulose nanofiber and silica particle composite.

A range of physical tests, electrical conductivity tests, and electrochemical performance tests were conducted on the uncoated and polymer-coated micro-fibrillated cellulose nanofiber-silica particle mat separators (MFC), prepared as described in detail above. Four MFC separator mats were prepared with varying contents by weight of silica particles. The MFC separator mats were initially prepared without coatings of porous PVDF. Separator designation MFC 1 consisted of only Celish micro-fibrillated cellulose nanofibers and no silica content. Separator MFC 2 consisted of one part by weight of Celish micro-fibrillated cellulose and one-half part by weight of silica powder. Separator MFC-3 consisted of equal parts by weight of Celish micro-fibrillated cellulose and silica powder. Separator MFC-4 consisted of one-part by weight Celish micro-fibrillated cellulose and one and one-half part by weight silica particles. Separator MFC 4c (the same cellulose-silica composition as MFC-4) was coated with porous PVDF in an amount that increased the thickness of the separator by two micrometers. The compressed thicknesses and other physical properties of these MFC separators were obtained and are summarized in the following Table 1.

Ionic conductivity measurements were also made on disc samples at 25° C. The samples were saturated with a liquid electrolyte (1M $LiPF_6$ in ethylene carbonate/dimethyl carbonate (1:1 by volume) and sandwiched between two stainless steel electrodes. The bulk resistances were measured on an impedance gain analyzer (Solitron SI 1260, Princeton Applied Research) and the effective ionic conductivity values were calculated. The effective ionic conductivities of the composite mats are also shown in Table 1. When saturated with a liquid electrolyte, the effective ionic conductivity enabled by MFC 1 (no silica content) was only about 0.14 mS/cm. However, the incorporation of ceramic particles created an open porous structure resulting in an increased ionic conductivity. The effective ionic conductivities were increased to 0.52 mS/cm, 1.06 mS/cm, and 1.28 mS/cm for MFC2, MFC3, and MFC4, respectively. As seen in the table, cMFC4 showed a slightly reduced ionic conductivity of 1.2 mS/cm compared to 1.28 mS/cm for MFC4.

Figure 3:
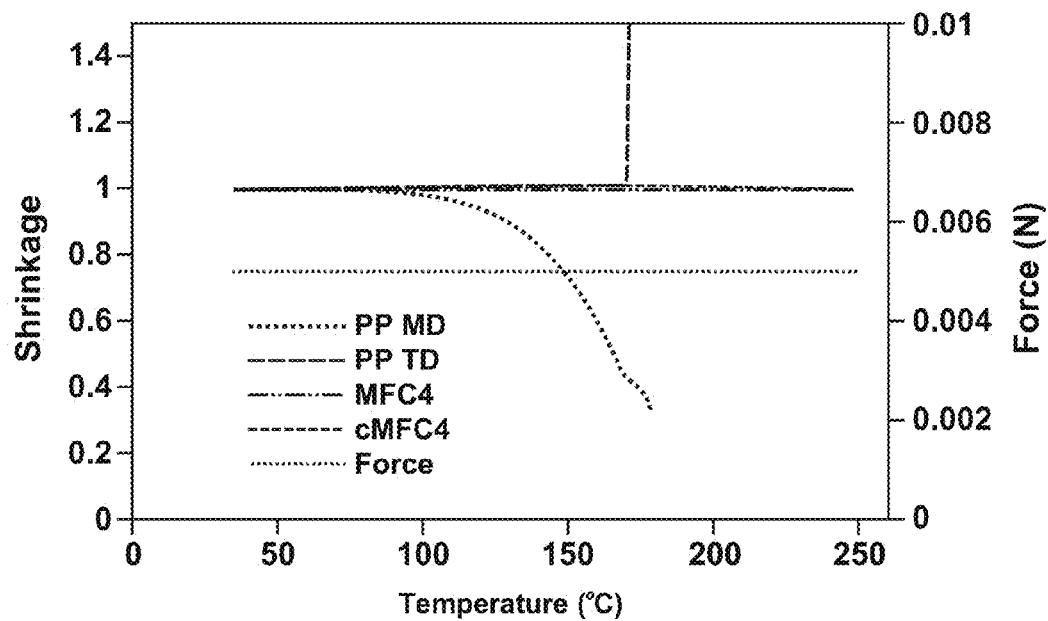
FIG. 3 is a graph of proportional shrinkage (y-axis—where the value 1 equals original length or no shrinkage) of (i) an uncoated cellulose fiber-silica powder separator mat, (ii) a PVDF-coated cellulose fiber-silica powder composite separator mat, and of (iii) a commercial polypropylene separator material, each during progressive heating from 30° C. to 240° C. A constant force of 0.005 N was applied to each separator mat sample.

For the dynamic mechanical analyzer tests, a preload force of 5 mN was applied and the temperature was ramped from 30° to 180° C. at a rate of 2° C./min. Commercial samples of polypropylene separators (Celgard 2400) were also tested in both machine direction (MD) and transverse direction (TD). FIG. 3 is a graph of the thermal response behaviors, tested using DMA, of the MFC-4 and MFC-4c mats as well the commercial PP separator. The value of 1 on the y-axis represents the original length of a test strip (and no shrinkage). Both MFC4 and cMFC4 showed no evident shrinkages when the temperature was ramped up to 250° C. The commercial separator shrank by 80% in the MD when the temperature was close to 180° C. The melt of polyolefin caused the abrupt increase in the elongation in the TD when the temperature was about 170° C. The corresponding data for the MFC1, MFC2, and MFC3 separator materials are not shown as they are very similar to those of MFC4 and cMFC4, and no evident shrinkages were observed.

Full electrochemical cells with graphite anodes and lithium-nickel-cobalt-manganese oxide cathodes were assembled to evaluate the subject MFC separator electrochemical performance. Anode and cathode materials were obtained and used to make full lithium-ion electrochemical cells in order to evaluate the electrochemical performance of the cellulose nanofiber-ceramic particle composite mats prepared in accordance with this invention. These electrode materials were TIMREX SLP 30 graphite (anode material) and $LiNi_{1/3}Co_{1/3}Mn_{1/3}O_2$ (sometimes designated NCM, for nickel, cobalt, manganese) (Toda NCM-01ST-100), respectively. The electrolyte used was 1M $LiPF_6$ in ethylene carbonate (EC)/dimethyl carbonate (DMC) 1:1 (v/v) (Novolyte Technologies). Cells were prepared with MFC-silica separators, with the MFC-4 and cMFC-4 separators of this invention, as well as with the commercial Celgard 2400 polypropylene separators.

TABLE 1

Effective ionic conductivity and tensile properties of the coated and un-coated separators

| Separator designation | Formulation (by weight) | Tensile strength (MPa) | Modulus (MPa) | Thickness (μm) | Effective conductivity (mS/cm) |
| --- | --- | --- | --- | --- | --- |
| MFC1 | MFC/Silica = 1/0 | 30.1 ± 0.8 | 1282 ± 125 | 23 | 0.14 |
| MFC2 | MFC/Silica = 1/0.5 | 20.7 ± 1.3 | 919 ± 69 | 24 | 0.52 |
| MFC3 | MFC/Silica = 1/1 | 12.2 ± 0.6 | 751 ± 88 | 25 | 1.06 |
| MFC4 | MFC/Silica = 1/1.5 | 8.6 ± 0.4 | 658 ± 87 | 28 | 1.28 |
| cMFC4 | PVDF coated MFC4 | 10.2 ± 0.8 | 506 ± 54 | 30 | 1.20 |

For improved thermal abuse tolerance, it is necessary to determine whether the subject MFC membranes will change shape or deteriorate when heated to such temperatures. The thermal-mechanical properties in terms of % shrinkage of the respective MFC membranes were evaluated using a dynamic mechanical analyzer (DMA Q800, TA Instruments). The membrane specimens were cut as strips, each having a length of ten centimeters and a width of one centimeter. The shrinkage of each tested specimen was measured in the length direction as its temperature was being increased (ramped). These tests were conducted to assess how much the respective separator materials would shrink in an electrochemical cell as the cell is heated from an ambient temperature to a potential maximum operating temperature of the cell. Of course, the separators are required to maintain their shape and effectiveness in maintaining physical separation between the electrodes of the cell.

Figure 4:
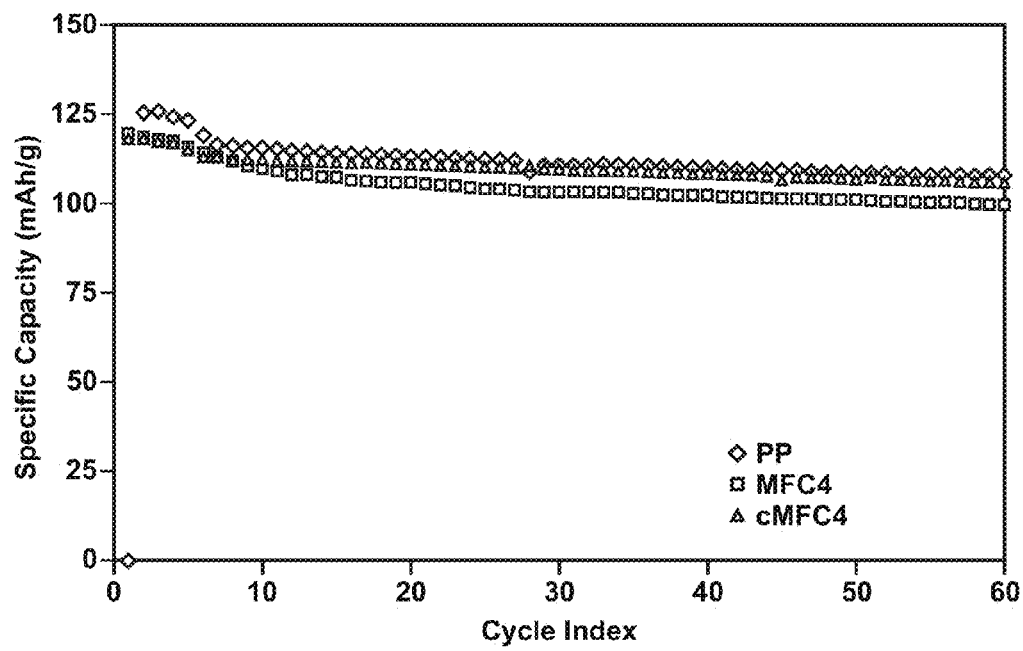
FIG. 4 is a graph of specific cell capacity (mAh/g) vs. number of discharge cycles for lithium-ion cells containing uncoated (filled square data points) and PVDF-coated cellulose fiber-silica composite separator mats (filled triangle data points), and for cells containing commercial polypropylene separators (filled diamond data points).

FIG. 4 is a graph of specific cell capacity (mAh/g) vs. number of discharge cycles for lithium-ion cells containing uncoated and PVDF-coated cellulose fiber-silica composite separator mats and for cells containing commercial polypropylene separators. Again, it is seen that the coated and uncoated, silica-containing, micro-fibrillated cellulose fiber mats retain their specific electrochemical conduction capacity as well as the PP separators over repeated cycling of the cells in which they are used.

Figure 5:
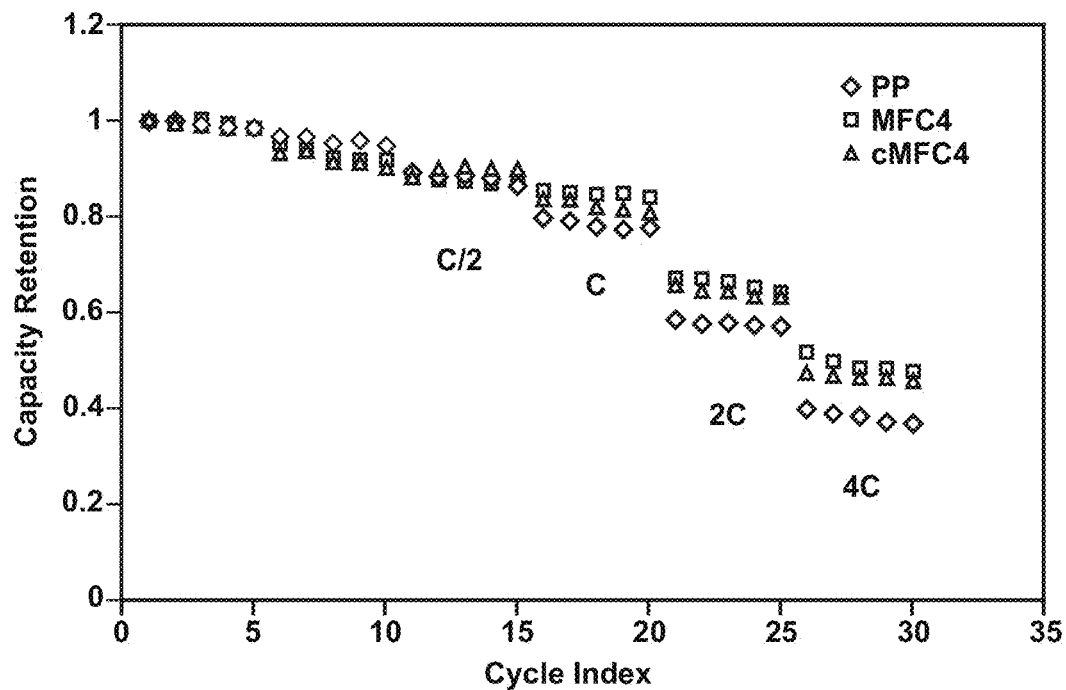
FIG. 5 is a graph of proportion of capacity retention (the value 1 equals full retention) during cell charge-discharge rates varying from C/10 to 4 C vs. number of charge-discharge cycles (cycle index) for lithium-ion coin-type cells using (i) an uncoated cellulose nanofibers and silica particles composite separator mat (filled square data points), (ii) a PVDF-coated, cellulose nanofibers and silica particles composite separator mat (filled triangle data points), and (iii) commercial polypropylene separator mats (filled diamond data points).

FIG. 5 is a graph of proportion of capacity retention during cell charge-discharge rates varying from C/10 to 4 C vs. number of charge-discharge cycles (cycle index) for lithium-ion coin-type cells using (i) an uncoated cellulose nanofibers and silica particles composite separator mat, (ii) a PVDF-coated, cellulose nanofibers and silica particles composite separator mat, and (iii) commercial polypropylene separator mats. The value of 1 on the y-axis represents the original capacity of the cells and the lower values represent the proportion of retained capacity after cycling.

These tests demonstrate that the MFC separators are as durable as PP separators as a stable cycle performance is demonstrated by the data in FIG. 4. And the MFC separators display better high rate performance than PP separators as illustrated in the data of FIG. 5.

MFC separators prepared as described above in this specification may be used in a wide variety of lithium-ion battery configurations and other electrochemical cells.

Figure 6:
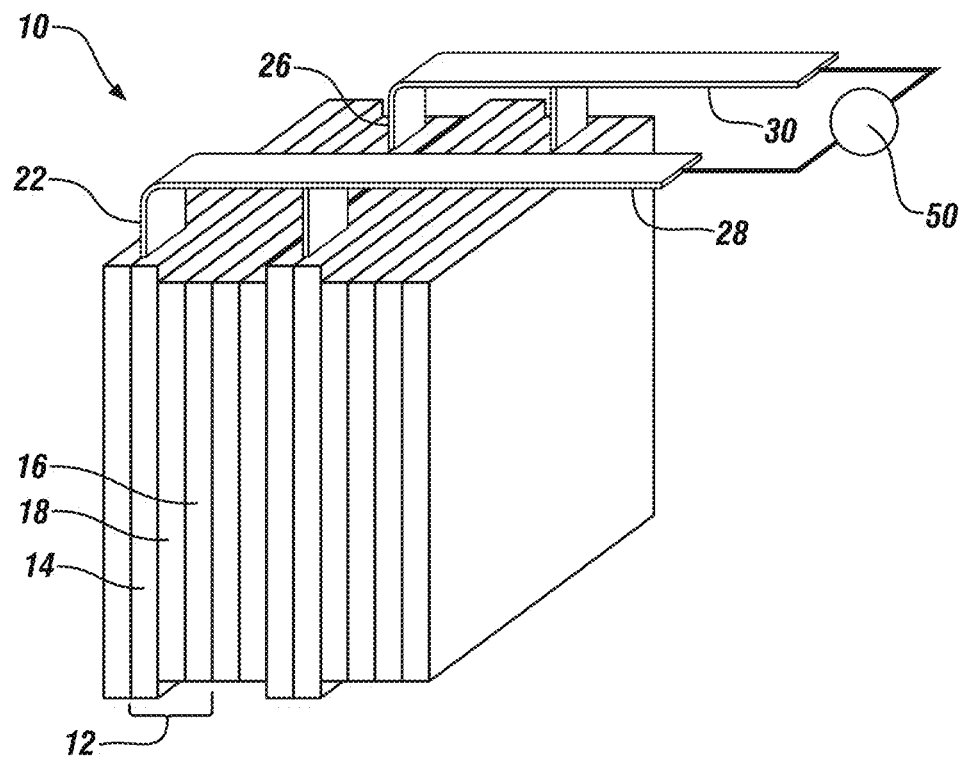
FIG. 6 is a schematic, generally side-elevation view of an interconnected group (or module) of lithium-ion electrochemical cells for a lithium-ion battery that includes a negative electrode, a positive electrode, and a porous separator mat which is a composite of porous polymer coated, micro-fibrillated cellulose fibers and ceramic particles in accordance with this disclosure. The electrodes are each associated with a compatible metallic current collector.

An exemplary and generalized illustration of a lithium ion battery 10 is depicted in FIG. 6. The lithium ion battery 10 shown here includes several rectangular-shaped electrochemical battery cells 12 that are each bracketed by metallic current collectors. The electrochemical battery cells 12 are stacked side-by-side in a modular configuration and connected in parallel (although a series connection is also permitted). The lithium ion battery (or cell groups) 10 can be connected serially or in parallel to other similarly constructed lithium ion batteries to form a lithium ion battery pack that exhibits the voltage and current capacity demanded for a particular application. It should be understood the lithium ion battery 10 shown here is only a schematic illustration. FIG. 6 is meant to show the relative position and physical interactions of the various components that constitute the electrochemical battery cells 12 (i.e., the electrodes and the separator); it is not intended to inform the relative sizes of the electrochemical battery cells' components, to define the number of electrochemical battery cells 12 in the lithium ion battery 10, or to limit the wide variety of structural configurations the lithium ion battery 10 may assume. Various structural modifications to the lithium ion battery 10 shown in FIG. 6 are possible despite what is explicitly illustrated.

The electrochemical battery cell 12 contained in the lithium ion battery 10 includes a negative electrode 14, a positive electrode 16, and the separator 18 situated between the two electrodes 14, 16. Each of the negative electrode 14, the positive electrode 16, and the separator 18 is wetted with a liquid electrolyte solution that is able to communicate lithium ions. A negative-side metallic current collector 20 that includes a negative polarity tab 22 is located between the negative electrodes 14 of adjacent electrochemical cells 12. Likewise, a positive-side metallic current collector 24 that includes a positive polarity tab 26 is located between neighboring positive electrodes 16. The negative polarity tab 22 is electrically coupled to a negative terminal 28 and the positive polarity tab 26 is electrically coupled to a positive terminal 30. An applied compressive force usually presses the metallic current collectors 20, 24, against the electrodes 14, 16 and the electrodes 14, 16 against the separator 18 to achieve intimate interfacial contact between adjacent contacting components.

Figure 7:
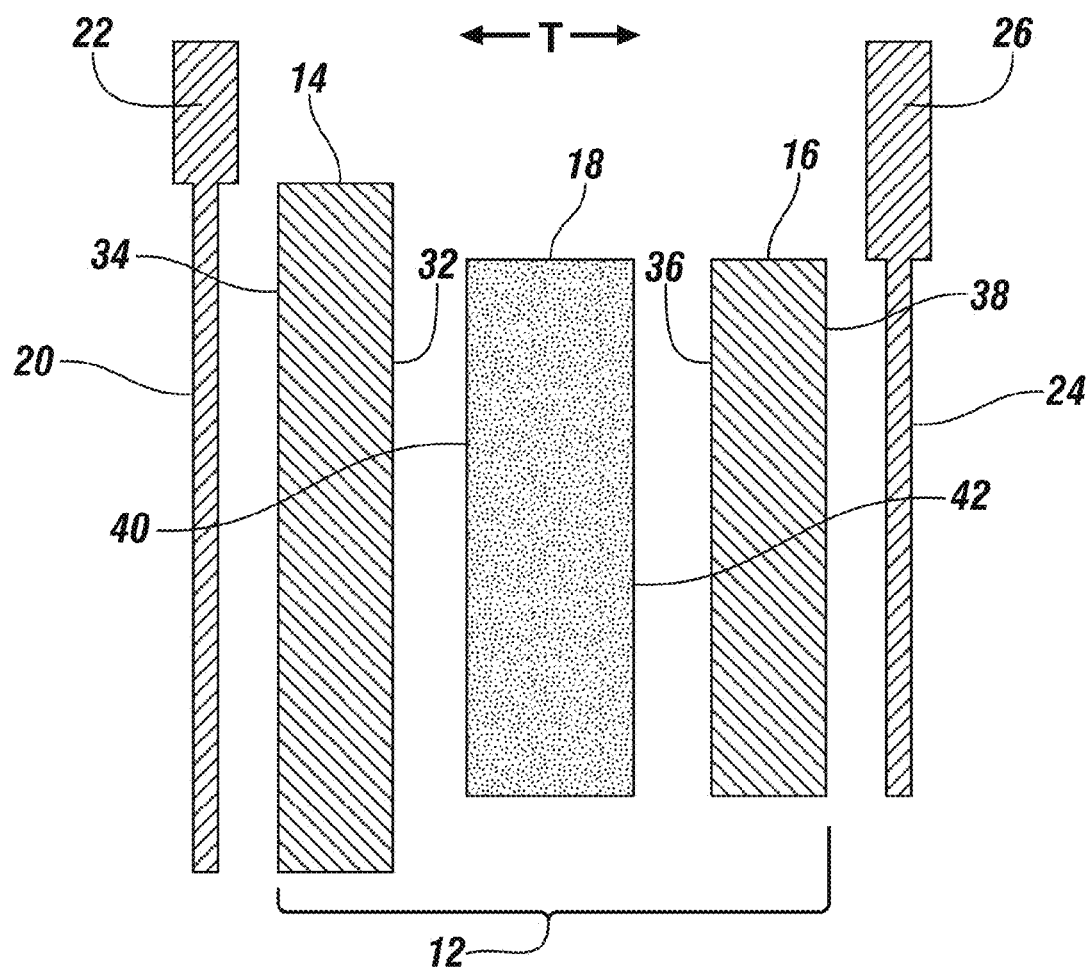
FIG. 7 is an exploded cross-sectional view of one of the electrochemical battery cells shown in FIG. 6 along with its associated metallic current collectors. The components are idealized representations that are not necessarily drawn to scale.

An exploded cross-sectional view of an electrochemical battery cell 12 of FIG. 6 and its associated metallic current collectors 20, 24 is generally illustrated in FIG. 7. The capital letter T, with the outwardly extended arrows, indicates the direction of the thicknesses of the members of the cell 12.

The negative electrode 14 includes an inner face surface 32 and an outer face surface 34 relative to the location of the separator 18. Of course, separator 18 may be formed of a mixture of micro-fibrillated cellulose fibers and ceramic particles as disclosed in this specification. The positive electrode 16 similarly includes an inner face surface 36 (with respect to separator 18) and an outer face surface 38. The inner face surface 32 of the negative electrode 14 may, but is not required to, encompass a larger two-dimensional surface area than the inner face surface 36 of the positive electrode 16, as shown. When assembled into the electrochemical battery cell 12, the inner face surfaces 32, 36 of the negative and positive electrodes 14, 16 confront one another and are pressed against a negative-side major face surface 40 and a positive-side major face surface 42 of the separator 18, respectively. Such pressed-engagement occurs generally uniformly along the entire interface of the major face surfaces 40, 42 of the separator 18 and the corresponding portions of the inner face surfaces 32, 36 of the electrodes 14, 16. The negative-side metallic current collector 20 is formed against the outer face surface 34 of the negative electrode 14 and the positive-side metallic current collector 24 is formed against the outer face surface 38 of the positive electrode 16. Both of the metallic current collectors 20, 24 engage their respective electrode outer face surfaces 34, 38 over an appreciable interfacial surface area to facilitate the efficient collection and distribution of free electrons.

The electrochemical cell 12 is generally thin and flexible. A typical thickness of the electrochemical cell 12 extending from the outer face surface 34 of the negative electrode 12 to the outer face surface 38 of the positive electrode 16 is about 80 μm to about 350 μm. Each electrode 14, 16 is preferably about 30 μm to 150 μm thick and, as already mentioned, the separator 18 is about 20 μm to 50 μm thick. The metallic current collectors 20, 24 are normally about 5 μm to 20 μm thick. The relatively thin and flexible nature of the electrochemical cell 12 and its associated metallic current collectors 20, 24 allows them to be rolled, folded, bent, or otherwise maneuvered into a variety of lithium ion battery configurations depending on design specifications and spatial constraints. The lithium ion battery 10 may, for example, include a number of distinct electrochemical cells 12 that have been fabricated, cut, aligned, and laid-up next to one another or, in an alternative embodiment, the cells 12 may be derived from a continuous layer that is folded back-and-forth over itself many times.

The negative electrode 14 includes a lithium host material that stores intercalated lithium at a relatively low electrochemical potential (relative to a lithium metal reference electrode) such as, for example, graphite or lithium titanate. The lithium host material may be intermingled with a polymeric binder material to provide the negative electrode 14 with structural integrity. The lithium host material is preferably graphite and the polymeric binder material is preferably one or more of polyvinyldiene fluoride (PVdF), an ethylene propylene diene monomer (EPDM) rubber, or a carboxymethoxy cellulose (CMC). Graphite is normally used to make the negative electrode 14 because, on top of being relatively inert, its layered structure exhibits favorable lithium intercalation and de-intercalation characteristics which help provide the electrochemical battery cell 12 with a suitable energy density. Commercial forms of graphite that may be used to construct the negative electrode 14 are available from Timcal Graphite and Carbon (headquartered in Bodio, Switzerland), Lonza Group (headquartered in Basel, Switzerland), and Superior Graphite (headquartered in Chicago, Ill.). The negative-side metallic current collector 20 associated with the negative electrode 14 is preferably a thin-film copper foil that coextensively contacts the outer face surface 34 of the negative electrode 14.

The positive electrode 16 includes a lithium-based active material that stores intercalated lithium at a higher electrochemical potential than the lithium host material used to make the negative electrode 14 (also relative to a lithium metal reference electrode). The same polymeric binder materials that may be used to construct the negative electrode 14 (PVdF, EPDM, CMC) may also be intermingled with the lithium-based active material to provide the positive electrode 16 with structural integrity. The lithium-based active material is preferably a layered lithium transition metal oxide, such as lithium cobalt oxide ($LiCoO_2$), a spinel lithium transition metal oxide, such as spinel lithium manganese oxide ($LiMn_xO_y$), a lithium polyanion, such as a nickel-manganese-cobalt oxide [$Li(Ni_xMn_yCo_z)O_2$], lithium iron phosphate ($LiFePO_4$), or lithium fluorophosphate ($Li_2FePO_4F$), or a mixture of any of these materials. Some other suitable lithium-based active materials that may be employed as all or part of the lithium-based active material include lithium nickel oxide ($LiNiO_2$), lithium aluminum manganese oxide ($Li_xAl_yMn_{1-y}O_2$), and lithium vanadium oxide ($LiV_2O_5$), to name but a few alternatives. The positive-side metallic current collector 24 associated with the positive electrode 16 is preferably a thin-film aluminum foil that coextensively contacts the outer face surface 38 of the positive electrode 16.

The cellulose-ceramic powder separator 18, as disclosed in this specification, functions as a thin and electrically insulative mechanical barrier layer that physically separates the confronting inner face surfaces 32, 36 of the electrodes 14, 16 to prevent a short-circuit in the electrochemical battery cell 12. The separator 18 is also sufficiently porous to permit infiltration of the liquid electrolyte solution and the internal passage of dissolved lithium ions. A rise in temperature that breaches 130° C. in the electrochemical cell 12 is to be endured by the separator 18 without a sacrifice in functionality. The commodity polymer material contained in the separator 18 of this disclosure will not soften, melt, or chemically react with the liquid electrolyte solution at such temperatures as is often the case with a polyolefin. The ability of the separator 18 to withstand potential spikes in temperature provides the electrochemical battery cell 12 with durability and helps prevent short-circuit events that may cause the cell 12 to lose capacity or fail altogether.

The liquid electrolyte solution infiltrated into the separator 18, and which wets both electrodes 14, 16, is preferably a lithium salt dissolved in a non-aqueous solvent. Some suitable lithium salts that may be used to make the liquid electrolyte solution include $LiClO_4$, $LiAlCl_4$, $LiI$, $LiBr$, $LiSCN$, $LiBF_4$, $LiB(C_6H_5)_4$, $LiAsF_6$, $LiCF_3SO_3$, $LiN(CF_3SO_2)_2$, $LiPF_6$, and a mixture that includes one or more of these salts. The non-aqueous solvent in which the lithium salt is dissolved may be a cyclic carbonate (i.e., ethylene carbonate, propylene carbonate), an acyclic carbonate (i.e., dimethyl carbonate, diethyl carbonate, ethylmethylcarbonate), an aliphatic carboxylic ester (i.e., methyl formate, methyl acetate, methyl propionate), a γ-lactone (i.e., γ-butyrolactone, γ-valerolactone), an acyclic ether (i.e., 1,2-dimethoxyethane, 1,2-diethoxyethane, ethoxymethoxyethane), a cyclic ether (i.e., tetrahydrofuran, 2-methyltetrahydrofuran), or a mixture that includes one or more of these solvents.

Referring back to FIG. 6, the negative and positive terminals 28, 30 of the lithium ion battery 10 may be connected to an electrical device 50 that generally encompasses power-consuming and power-generating devices. A power-consuming device is one that is powered fully or partially by the lithium ion battery 10 when operating in a discharge state. Conversely, a power-generating device is one that charges or re-powers the lithium ion battery 10. The power-consuming device and the power-generating device can be the same device in some instances. For example, the electrical device 50 may be an electric motor for a hybrid electric or an extended range electric vehicle that is designed to draw an electric current from the lithium ion battery 10 during acceleration and provide a regenerative electric current to the lithium ion battery 10 during deceleration. The power-consuming device and the power-generating device can also be different devices. For example, the power-consuming device may be an electric motor for a hybrid electric or an extended range electric vehicle and the power-generating device may be an AC wall outlet, an internal combustion engine, and/or a vehicle alternator.

The lithium ion battery 10 can provide a useful electrical current to the electrical device 50 by way of reversible electrochemical reactions that occur in the electrochemical battery cell 12 when a closed-circuit connects the negative terminal 28 and the positive terminal 30 at a time when the negative electrode 14 contains a sufficient quantity of intercalated lithium (i.e., battery discharge). The electrochemical potential difference between the negative electrode 14 and the positive electrode 16—approximately 2.5 to 4.3V depending on the composition of the electrodes 14, 16—drives the oxidation of intercalated lithium contained in the negative electrode 14. Free electrons produced by this oxidation reaction are collected by the negative-side current collector 20 and supplied to the negative terminal 28. A flow of free electrons is harnessed and directed through the electrical device 50 from the negative terminal 28 to the positive terminal 30 and eventually to the positive electrode 16 by way of the positive-side current collector 24. Lithium ions, which are also produced at the negative electrode 14, are concurrently carried through the separator 18, more specifically through the tortuous and interconnected network of pores defined in the polymer material matrix, by the liquid electrolyte solution in route to the positive electrode 16. The flow of free electrons through the electrical device 50 from the negative terminal 28 to the positive terminal 30 can be continuously or intermittently provided until the negative electrode 14 is depleted of intercalated lithium and the capacity of the electrochemical battery cell 12 is spent.

The lithium ion battery 10 can be charged or re-powered at any time by applying an external voltage originating from the electrical device 50 to the electrochemical battery cell 12 to reverse the electrochemical reactions that occur during discharge. The applied external voltage compels the otherwise non-spontaneous oxidation of intercalated lithium contained in the positive electrode 16 to produce free electrons and lithium ions. The free electrons are collected by the positive-side current collector 24 and supplied to the positive terminal 30. A flow of the free electrons is directed to the negative terminal 28 and eventually to the negative electrode 14 by way of the negative-side current collector 20. The lithium ions are concurrently carried back through the separator 18 in the liquid electrolyte solution towards the negative electrode 14. The lithium ions and the free electrons eventually reunite and replenish the negative electrode 14 with intercalated lithium to prepare the electrochemical battery cell 12 for another discharge phase.

While lithium-ion electrochemical cells and other electrochemical cells may be prepared in many sizes and shapes, separators between the electrodes are typically required. The thin, porous mat or membranes of this invention that are readily formed, as described, using Celish micro-fibrillated cellulose fibers spaced apart with fine ceramic particles may serve in many of these cell constructions. As stated, such separator constructions are particularly well adapted for lithium-ion cells because the combination of the cellulose fibers and ceramic particles can be laid up from an aqueous suspension to form suitably porous and durable separator mats that complement the function of the cell. And when the cellulose fibers and ceramic particles of the mat structure are coated with a thin porous film of a suitable polymer their structure is further strengthened and made more durable.

While practices and embodiments of the invention have been illustrated by exemplary examples, the use of specific examples is not intended to limit the scope of the claimed invention.

The invention claimed is:

1. A separator structure for separation of electrodes in an electrochemical cell, the separator structure being in the form of a flat, but foldable or rollable porous layer having a thickness no greater than about fifty micrometers, the separator layer structure comprising micro-fibrillated nanofibers comprising stems with fibrillated, branching fibers, the micro-fibrillated nanofibers having lengths ranging from about five micrometers to a thousand micrometers and a combined specific surface area of from about 50 $m^2$/g to about 300 $m^2$/g, the micro-fibrillated nanofibers being randomly-oriented in the flat porous layer, and intermixed and spaced-apart with ceramic particles, the micro-fibrillated nanofiber stems having diameters in a range of about 0.01 to about 0.1 micrometers and the overall diameters of the micro-fibrillated nanofiber fiber stems and the branching fibers being up to 2 micrometers, the flat layer separator structure being porous for infiltration with a liquid electrolyte, the separator structure being resistant to shrinkage when heated to temperatures up to 150° C., the composition of the micro-fibrillated nanofibers being selected from the group consisting of cellulose, poly(acrylonitrile), polyamides, and polyethylene terephthalate, and the separator structure having a pore volume that is 20% to 90% of the outline volume of the separator structure.

2. A separator structure as stated in claim 1 in which the ceramic particles are alumina particles or silica particles having an average particle size in the range of 0.2 to 1 micrometer, and the weight proportion of ceramic particles to nanofibers is in the range of about 25% to about 300%.

3. A separator structure as stated in claim 1 in which the randomly-oriented micro-fibrillated, branched, nanofibers and intermixed ceramic particles are coated with a porous polymer layer distributed throughout the separator structure in an amount for stabilizing the spatial relationship of the ceramic particles and nanofibers while retaining porosity in the structure for infiltration with a liquid electrolyte and without increasing the thickness of the separator structure by more than 2 micrometers.

4. A separator structure as stated in claim 3 in which randomly-oriented nanofibers and intermixed ceramic particles are coated with a layer of porous polyvinylidene fluoride.

5. A separator structure as stated in claim 3 in which the porous polymer coating has a polymer composition selected from the group consisting of poly(acrylonitrile), poly (methyl methacrylate), and polyvinylidene fluoride, and co-polymers that contain segments of acrylonitrile, methyl methacrylate and vinylidene difluoride.

6. A separator structure as stated in claim 1 in which the separator structure has a pore volume that is 30% to 70% of the outline volume of the separator structure.

7. A lithium-ion electrochemical cell comprising an anode that is capable of being intercalated with lithium, a cathode that is capable of being intercalated with lithium, a lithium-ion containing liquid electrolyte in liquid contact with each of the anode and cathode, and a porous separator structure that physically separates the anode and cathode and that is infiltrated with the liquid electrolyte; the separator structure comprising a flat, but foldable or rollable porous layer having a thickness no greater than about fifty micrometers, the separator layer the separator layer structure comprising micro-fibrillated nanofibers comprising stems with fibrillated, branching fibers, the micro-fibrillated nanofibers having lengths ranging from about five micrometers to a thousand micrometers and a combined specific surface area of from about 50 $m^2$/g to about 300 $m^2$/g, the micro-fibrillated nanofibers being randomly-oriented in the flat porous layer, and intermixed and spaced-apart with ceramic particles, the micro-fibrillated nanofiber stems having diameters in a range of about 0.01 to about 0.1 micrometers and the overall diameters of the micro-fibrillated nanofiber fiber stems and the branching fibers being up to 2 micrometers, the flat layer separator structure being porous for infiltration with a liquid electrolyte, the separator structure being resistant to shrinkage when heated to temperatures up to 150° C., the composition of the nanofibers being selected from the group consisting of cellulose, poly(acrylonitrile), polyamides, and polyethylene terephthalate, and the separator structure having a pore volume that is 20% to 90% of the outline volume of the separator structure.

8. A lithium-ion cell is stated in claim 7 in which the ceramic particles of the separator structure are alumina particles or silica particles having an average particle size in the range of about 0.2 to 1 micrometer, and the weight proportion of ceramic particles to nanofibers is in the range of about 25% to about 300%.

9. A lithium-ion cell is stated in claim 7 in which the nanofibers and intermixed ceramic particles of the separator structure are coated with a porous polymer layer distributed throughout the separator structure in an amount for stabilizing the spatial relationship of the ceramic particles and nanofibers while retaining porosity in the structure for infiltration with a liquid electrolyte and without increasing the thickness of the separator structure by more than 2 micrometers.

10. A lithium-ion cell as stated in claim 9 in which the randomly-oriented nanofibers and intermixed ceramic particles of the separator structure are coated with a layer of porous polyvinylidene fluoride.

11. A lithium-ion cell as stated in claim 9 in which the porous polymer coating of the separator structure has a polymer composition selected from the group consisting of poly (acrylonitrile), poly (methylmethacrylate), and polyvinylidene fluoride, and co-polymers that contain polymer segments of acrylonitrile, methylmethacrylate and vinylidene difluoride.

12. A separator structure as stated in claim 7 in which the separator structure has a pore volume that is 30% to 70% of the outline volume of the separator structure.

\* \* \* \* \*